United States Patent
Lee

(10) Patent No.: US 10,731,541 B2
(45) Date of Patent: Aug. 4, 2020

(54) CONTROL SYSTEM AND CONTROL METHOD FOR COOLANT CONTROL VALVE UNIT

(71) Applicants: HYUNDAI MOTOR COMPANY, Seoul (KR); KIA MOTORS CORPORATION, Seoul (KR)

(72) Inventor: Yonggyu Lee, Suwon-Si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/204,773

(22) Filed: Nov. 29, 2018

(65) Prior Publication Data

US 2020/0088088 A1    Mar. 19, 2020

(30) Foreign Application Priority Data

Sep. 17, 2018    (KR) .................. 10-2018-0110970

(51) Int. Cl.
*F01P 7/14*     (2006.01)
*F16K 11/16*    (2006.01)
*F16K 31/524*   (2006.01)

(52) U.S. Cl.
CPC .......... *F01P 7/14* (2013.01); *F01P 2007/146* (2013.01); *F01P 2023/08* (2013.01); *F16K 11/166* (2013.01); *F16K 31/52416* (2013.01); *F16K 31/52433* (2013.01)

(58) Field of Classification Search
CPC ...... F01P 7/14; F01P 2007/146; F16K 11/166
See application file for complete search history.

(56) References Cited

U.S. PATENT DOCUMENTS

| 8,701,603 B2* | 4/2014 | Warnery | F01P 7/167 123/41.08 |
| 2004/0139949 A1* | 7/2004 | Koseki | F01L 1/20 123/568.14 |
| 2009/0039301 A1* | 2/2009 | Midorikawa | F01L 1/3442 251/129.15 |

* cited by examiner

*Primary Examiner* — Kevin A Lathers
(74) *Attorney, Agent, or Firm* — Morgan, Lewis & Bockius LLP

(57) ABSTRACT

A control system for a coolant control valve unit, which includes a cam and a valve that opens and closes a coolant passage in conjunction with rotation of the cam, includes: a motor controlling the rotation of the cam; and a controller configured to correct a target valve opening degree of the valve using a correction value according to a degree of wear of the valve, to determine a target rotational angle of the cam using the target valve opening degree corrected by the correction value, and to control an operation of the motor according to the target rotational angle of the cam.

9 Claims, 5 Drawing Sheets

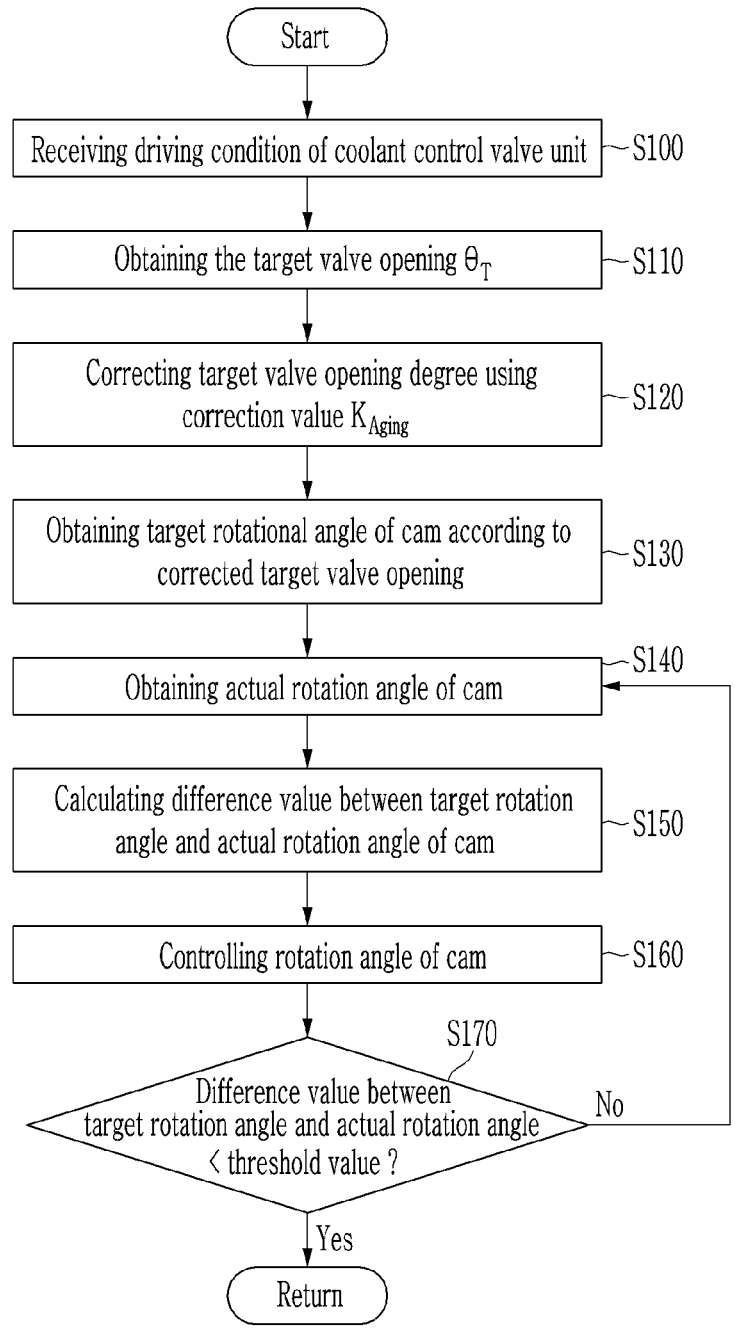

CONTROL SYSTEM AND CONTROL METHOD FOR COOLANT CONTROL VALVE UNIT

CROSS-REFERENCE TO RELATED APPLICATION

This application claims priority to and the benefit of Korean Patent Application No. 10-2018-0110970 filed in the Korean Intellectual Property Office on Sep. 17, 2018, the entire contents of which are incorporated herein by reference.

TECHNICAL FIELD

The present disclosure relates to a control system and a control method for coolant control valve unit.

BACKGROUND

An engine discharges thermal energy while generating torque based on combustion of a fuel, and a coolant absorbs thermal energy while circulating through an engine, a heater, and a radiator, and releases the thermal energy to an outside.

When a temperature of the coolant of the engine is low, viscosity of oil may increase to increase frictional force and fuel consumption, and a temperature of an exhaust gas may increase gradually to lengthen a time for a catalyst to be activated which degrades quality of the exhaust gas. In addition, as a time required for a function of the heater to be normalized is increased, a driver may be discomfort.

When the coolant temperature is excessively high, since knocking occurs, performance of the engine may deteriorate by adjusting ignition timing in order to suppress the knocking, when a temperature of lubricant is excessively high, a viscosity is lowered such that a lubrication performance may be deteriorated.

Therefore, a technology to control several cooling elements through one valve unit, such as keeping the high temperature of the coolant for a certain part of the engine and keeping the low temperature of the coolant for other part low is applied.

As an example of a conventional art, the coolant control valve unit includes a motor, a cam rotated by the motor, a rod moved by a track formed at one surface of the cam, and a valve formed on the rod and has a structure opening and closing a coolant passage through the valve if the cam is rotated by the motor and the track of the cam pushes the rod. Friction occurs between the cam and the valve rod, which causes wear on the relatively low-strength valve rod when the valve is operated for a longer period of time. Wear of the valve rod shortens the length of the valve rod to change an opening height when the valve is fully opened, and also changes an angle of the cam from which the valve starts to open. Therefore, in the process of controlling the flow rate of the coolant to the target temperature, it is difficult to precisely control the flow rate of the coolant, so that it may be difficult to control the coolant temperature.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a control system and a control method for coolant control valve unit having advantages of compensating for valve opening error due to valve rod wear.

A control system for a coolant control valve unit, which includes a cam and a valve that opens and closes a coolant passage in conjunction with rotation of the cam, according to an exemplary embodiment of the present disclosure may include: a motor controlling the rotation of the cam; and a controller configured to correct a target valve opening degree of the valve using a correction value according to a degree of wear of the valve, to determine a target rotational angle of the cam using the target valve opening degree corrected by the correction value, and to control an operation of the motor according to the target rotational angle of the cam.

The controller may accumulate the rotational angle of the cam to obtain a rotational angle cumulative value and determines the correction value according to the rotational angle cumulative value.

The correction value may increase as the cumulative rotational angle value increases.

The control system may further include a cam position detecting sensor detecting the rotational angle of the cam.

The controller may control the operation of the motor based on a difference between an actual rotational angle of the cam and the target rotational angle The controller may calculate the target valve opening degree based on a driving condition of the coolant control valve unit and a difference between a target coolant temperature and a current coolant temperature.

A control method for a coolant control valve unit, which includes a cam driven by a motor and a valve that opens and closes a coolant passage in conjunction with rotation of the cam, according to an exemplary embodiment of the present disclosure may include: calculating, by a controller, a target valve opening degree of the valve; correcting, by the controller, the target valve opening degree of the valve using a correction value according to a degree of wear of the valve; determining, by the controller, a target rotational angle of the cam using the target valve opening degree corrected by the correction value; and controlling, by the controller, an operation of the motor according to the target rotational angle of the cam.

The control method may further include accumulating, by the controller, the rotational angle of the cam to obtain a rotational angle cumulative value, and determining, by the controller, the correction value according to the rotational angle cumulative value.

The correction value may increase as the cumulative rotational angle value increases.

The control method may further include obtaining, by the controller, an actual rotational angle of the cam.

The controller may control the operation of the motor based on a difference between the actual rotational angle of the cam and the target rotational angle.

The calculating the target valve opening degree of the valve may include obtaining a driving condition of the coolant control valve unit, and calculating the target valve opening degree based on the driving condition of the coolant control valve unit and a difference between a target coolant temperature and a current coolant temperature.

According to an exemplary embodiment of the present disclosure, it is possible to control the coolant temperature in a stable manner by compensating the valve opening error due to wear of the valve for controlling the coolant flow rate.

BRIEF DESCRIPTION OF THE DRAWINGS

FIG. 5 is a flowchart showing a control method of a coolant control valve unit according to an exemplary embodiment of the present disclosure.

DETAILED DESCRIPTION OF THE EMBODIMENTS

Figure 1:
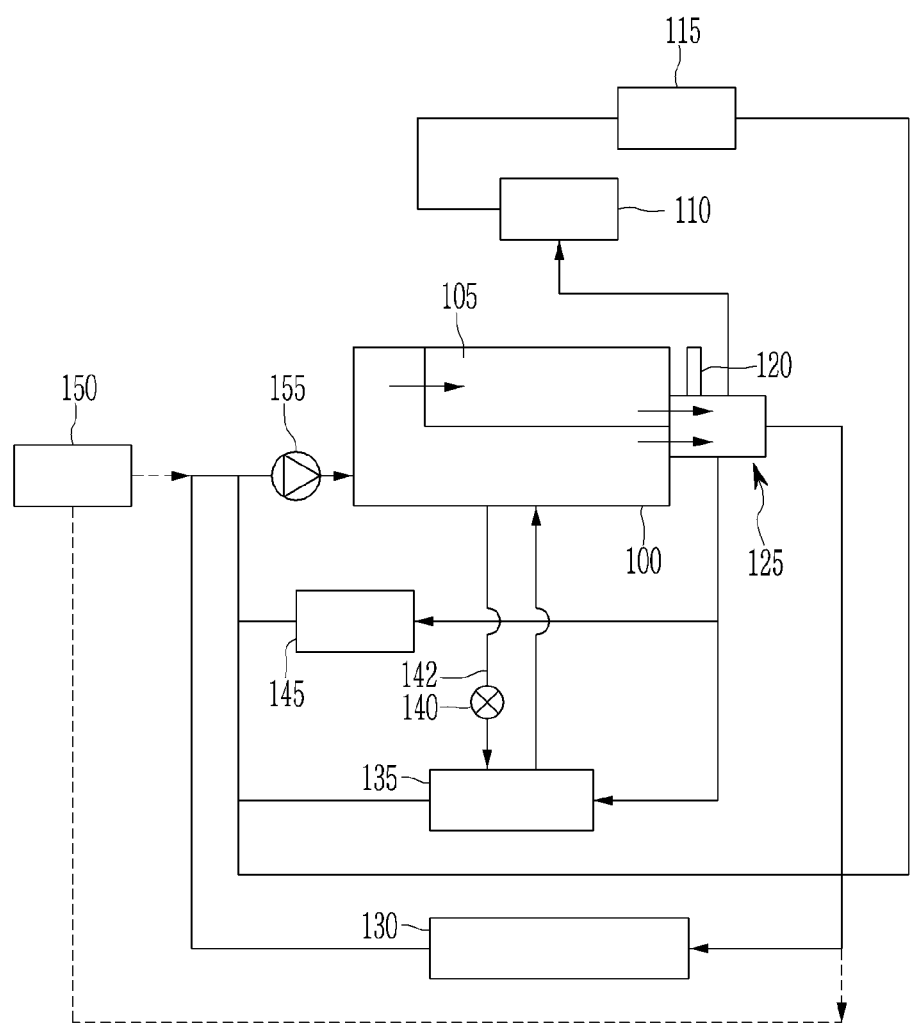
FIG. 1 is a schematic diagram of a flow of a coolant in a control system of a coolant control valve unit according to an exemplary embodiment of the present disclosure.

Hereinafter, an exemplary embodiment of the present disclosure will be described in detail with reference to the accompanying drawings. However, the size and thickness of each component illustrated in the drawings are arbitrarily shown for ease of description and the present disclosure is not limited thereto, and the thicknesses of portions and regions are exaggerated for clarity.

In addition, parts that are irrelevant to the description are omitted to clearly describe the exemplary embodiments of the present disclosure, and like reference numerals designate like elements throughout the specification.

In the following description, dividing names of components into first, second, and the like is to divide the names because the names of the components are the same, and an order thereof is not particularly limited.

FIG. 1 is a schematic diagram of a flow of a coolant in a control system of a coolant control valve unit according to an exemplary embodiment of the present disclosure.

Referring to FIG. 1, a cooling system includes a cylinder block 100, a cylinder head 105, a low pressure (LP) exhaust gas recirculation (EGR) cooler 110, a heater core 115, a coolant temperature sensor 120, a coolant control valve unit 125, a radiator 130, an oil cooler 135, an oil control valve 140, an oil supply line 142, a high pressure (HP) EGR valve 145, a reservoir 150, and a coolant pump 155.

The coolant pump 155 pumps the coolant to a coolant inlet side of the cylinder block 100 and the pumped coolant is distributed to the cylinder block 100 and the cylinder head 105.

The coolant control valve unit 125 is mounted at the coolant outlet side of the cylinder head 105, continuously receives the coolant from the cylinder head 105, and may control an opening rate of a coolant outlet side coolant passage of the cylinder block 100.

The coolant temperature sensor 120 sensing the temperature of the coolant exhausted from the cylinder head 105 or the cylinder block 100 is disposed on the coolant control valve unit 125.

The coolant control valve unit 125 may respectively control the coolant flow distributed to the heater core 115 and the radiator 130. Here, the coolant may pass through the LP-EGR cooler 110 before passing through the heater core 115, and the heater core 115 and the LP-EGR cooler 110 may be disposed in series or in parallel.

The coolant control valve unit 125 may continuously distribute the coolant to the HP-EGR valve 145 and the oil cooler 135. A part of an engine oil circulated along the cylinder block 100 and the cylinder head 105 may be cooled while circulating the oil cooler 135, and the oil control valve 140 is disposed on the oil supply line 142. Here, the oil control valve 140 may be actively controlled or may be mechanically operated such as a thermostat.

Figure 2:
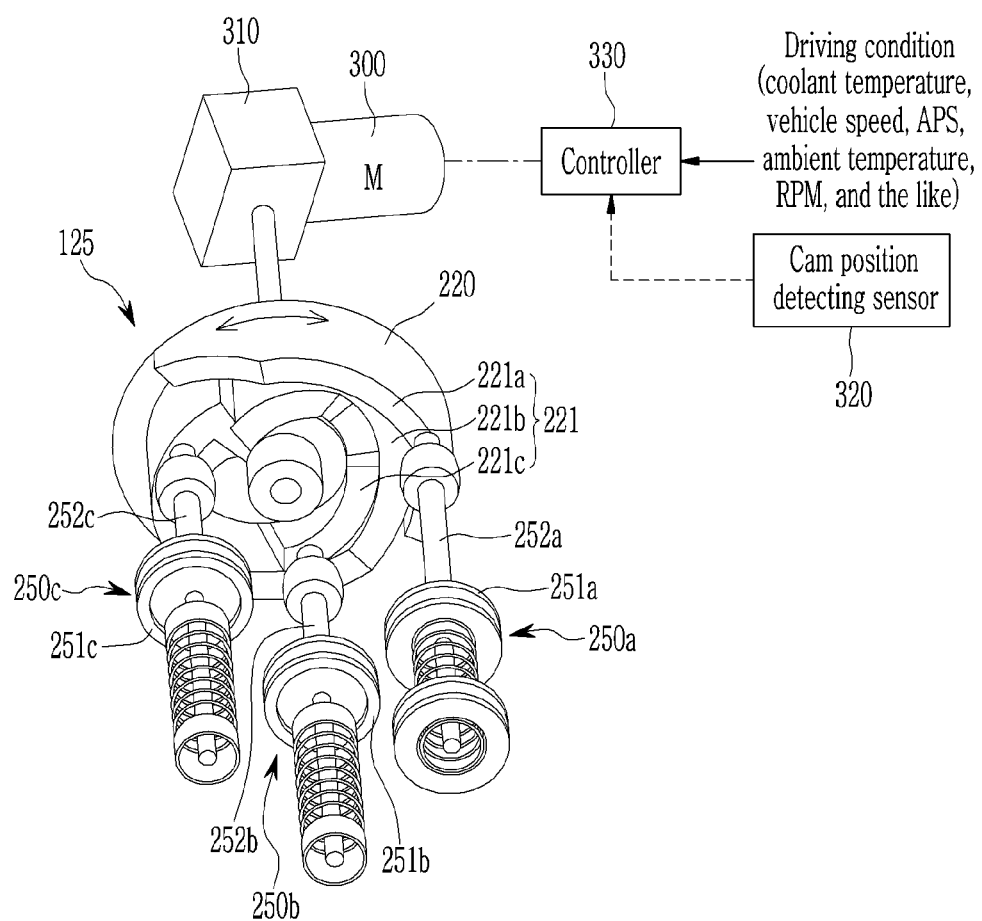
FIG. 2 is a partial exploded perspective view of a coolant control valve unit according to an exemplary embodiment of the present disclosure.
Figure 3:
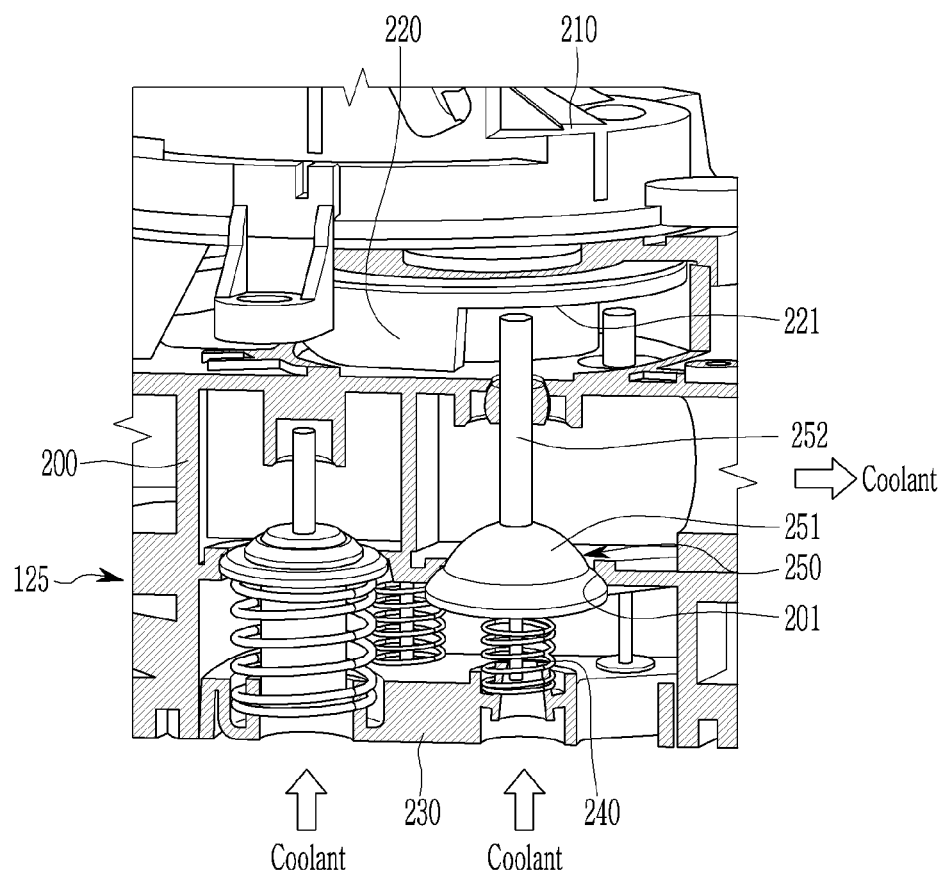
FIG. 3 is a partial cross-sectional view of a coolant control valve unit according to an exemplary embodiment of the present disclosure.
Figure 4:
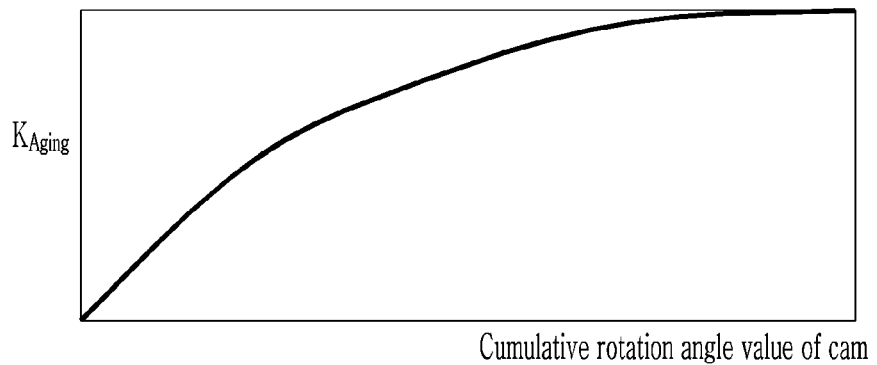
FIG. 4 is a graph showing a relationship between an accumulated value of a rotational angle of a cam and a correction value according to a degree of abrasion of a valve in an exemplary embodiment of the present disclosure.

FIG. 2 is a partial exploded perspective view of a coolant control valve unit according to an exemplary embodiment of the present disclosure and FIG. 3 is a partial cross-sectional view of a coolant control valve unit according to an exemplary embodiment of the present disclosure. FIG. 4 is a graph showing a relationship between an accumulated value of a rotational angle of a cam and a correction value according to a degree of abrasion of a valve in an exemplary embodiment of the present disclosure.

Referring to FIG. 2, the control system according to an exemplary embodiment of the present disclosure includes the coolant control valve unit 125, a motor 300, a gear box 310, a cam position detecting sensor 320 and a controller 330.

The coolant control valve unit 125 may control coolant flow flowing though the heater core 115, the LP-EGR cooler 110, the radiator 130, the oil cooler 135, and the HP-EGR valve 145.

Referring to FIG. 3, the coolant control valve unit 125 includes a housing 200, a cover 210, a cam 220, a holder 230, an elastic member 240, and a valve 250.

The holder 230 is fixed and disposed at a lower part of the housing 200 and the holder 230 supports a lower end of the elastic member 240.

The elastic member 240 supports a lower part of the valve 240 upward so that the valve 240 closes the coolant passage 201.

The valve 250 includes a valve head 251 and a valve rod 252 and may be a poppet valve.

The lower surface of the valve 250 is flat, the valve head 251 has a sharp in a center upper direction, and the valve head 251 contacts the coolant passage 201 to close the coolant passage 201. A lower part of the valve head 251 is supported by the elastic member 240 and the valve rod 252 is connected to the upper part of the valve head 251. The valve rod 252 is extended to an upper direction thereof having a predetermined length and an upper end of the valve rod 252 contacts of a track 221.

The track 221 having a predetermined inclination and a height is formed on the lower surface of the cam 250, and the track 221 pushes the upper end of the rod 252 downward according to a rotation position of the cam 220. Accordingly, while the elastic member 240 is compressed, the valve 250 may open and close the coolant passage 201. Here, an opening rate of the coolant passage 201 may be controlled according to the rotation position of the cam 220. This is because the position of the track 221 in which the upper end of the valve rod 252 contacts is changed according to the rotational angle of the cam 220 and the height of the track 221 varies depending on the position.

In an embodiment of the present disclosure, the coolant control valve unit 125 includes two or more tracks 221 and corresponding two or more valves 250, and each of two or more coolant passages 201, and openings of each of two or more coolant passages 201 are controlled by a different valve 250. For example, referring to FIG. 2, three tracks 221a, 221b, and 221c are formed to the lower surface of the cam 220 and three valves 250a, 250b, and 250c corresponding to the three tracks 221a, 221b, and 221c are mounted. Three coolant passages corresponding to the valves 250a, 250b, and 250c may be formed to the coolant control valve unit 125. One of the coolant passages is communicated with the heater core 115 and the LP-EGR cooler 110. Another coolant passage of the coolant passages is communicated with the radiator 130 and the other coolant passage of the coolant passages is communicated with the cylinder block 100.

On the other hand, the coolant control valve unit according to the embodiment of the present disclosure is not limited to the coolant control valve unit shown in FIGS. 2 and 3, and may be a structure of all known coolant control valve units capable of opening and closing at least two coolant passages.

Referring to FIG. 2, the controller 330 controls the motor 300 by using driving conditions (a coolant temperature, an ambient temperature, etc.) and a position of cam 220 received from a cam position detecting sensor 320, and the motor 300 varies the rotation position of the cam 220 through the gear box 310.

The cam position detecting sensor 320 may be a sensor directly sensing the rotation position of the cam 220

The controller 330 may indirectly calculate the rotation position of the cam 220 by sensing the rotation position of the motor 300 through a resolver (not shown).

The controller 330 obtains the driving conditions of the coolant control valve unit 125 and calculates the target rotational angle of the cam 220 using the driving conditions.

The driving condition may include, for example, output signals of the coolant temperature sensor 120, a vehicle speed sensor (not shown), an Accelerator position sensor (APS), an ambient temperature sensor, and a revolutions per minute (RPM) sensor and the like.

The schemes and operations of the vehicle speed sensor, the APS, the ambient temperature sensor, and the RPM sensor and the like are obvious to those skilled in the art, so a detailed description thereof will be omitted.

Hereinafter, a method of calculating the target rotational angle of the cam 220 in the controller 330 will be described in detail with reference to Equations 1 and 2.

When the driving condition is obtained, the controller 330 may calculate the target valve opening $\theta_{valve}$ as shown in Equation 1 below.

$$\theta_{valve}(T_M - T_T) \times K_P \times K_S \times K_{AT} \times K_L + \int_a^b K_I (T_M - T_T) \quad \text{[Equation 1]}$$

In the above equation (1), $T_M$ is the value detected by the coolant temperature sensor 120 as a current coolant temperature, and $T_T$ represents a target coolant temperature. $K_P$ represents a proportional (P) gain, $K_S$ represents a correction value according to a vehicle speed, $K_{AT}$ represents a correction value according to an outside air temperature, and $K_L$ represents a correction value according to an engine load (engine torque and engine rotation speed RPM). Further, $K_I$ denotes an integral (I) gain, and "a" and "b" denote integral periods.

In Equation 1, the $K_S$, $K_{AT}$, and $K_L$ may be obtained using a lookup table. That is, the correction values according to the vehicle speed, the outside air temperature, and the engine load are stored in the form of a lookup table, and the controller 330 may obtain the $K_S$, $K_{AT}$ and $K_L$ using the current driving conditions of the vehicle as inputs to the respective lookup tables.

In the above equation 1, $K_P$, $K_I$, "a," and "b" may be derived calibrated values obtained through testing in the production process of the coolant control valve unit 125.

Referring to Equation 1, the target valve opening degree $\theta_{valve}$ is basically determined based on the difference between the target coolant temperature and the actual coolant temperature, and further the correction values $K_S$, $K_{AT}$ and $K_L$, the proportional gain ($K_P$), and the integral gain ($K_I$) may be applied thereto.

When the target valve opening degree $\theta_{valve}$ is calculated using Equation 1, the controller 330 corrects (or compensates) the target valve opening degree $\theta_{valve}$ using a correction value $K_{Aging}$ according to a degree of wear of the valve 250, Can be corrected.

$$\theta_T = \theta_{valve} + K_{Aging} \quad \text{[Equation 2]}$$

In Equation 2, the controller 330 accumulates a rotational angle of the cam 220 to obtain a rotational angle cumulative value and determines the correction value $K_{Aging}$ according to the rotational angle cumulative value. Abrasion of the valve rod 252 of the valve 250 may be proportional to the number of times that the track 221 of the cam 220 rubs against the valve rod 252 due to the rotation of the cam 220. Therefore, in the embodiment of the present disclosure, the rotational angle of the cam 220 is continuously accumulated from the time when new valve 250 is mounted on the coolant control valve unit 125, and the rotational angle of the cam 220 is accumulated. The correction value $K_{Aging}$ according to the degree of wear of the valve 250 may be obtained based on the rotational angle cumulative value Here, the accumulated value of the rotational angle of the cam 220 may be reset when the valve 250 is replaced Table 1 below shows an example of the correction values $K_{Aging}$ according to the accumulated value of the rotational angle of the cam 220.

TABLE 1

Correction values $K_{Aging}$ according to the accumulated value of the rotational angle of the cam 220.

| | Rotational angle cumulative value [°] | | | | | | |
|---|---|---|---|---|---|---|---|
| | 0 | 1000 | 2000 | 3000 | 4000 | 5000 | 6000 |
| $K_{Aging}$ | 0 | 5 | 10 | 15 | 20 | 25 | 30 |

Referring to FIG. 4 and Table 1, the correction value $K_{Aging}$ may be set so that as the rotation of the cam 220 is accumulated, that is, as the cumulative value of the rotational angle of the cam 220 increases, the value gradually increases. The correction values $K_{Aging}$ according to the values obtained by accumulating the rotational angles of the cams 220 are calibration values derived through testing in the course of production of the valves. The rotational angle cumulative values and the correction values $K_{Aging}$ may be stored in the form of a mapped lookup table (Hereinafter, referred to as "correction value lookup table").

That is, when the rotational angle accumulation value of the cam 220 is calculated, the controller 330 may input the rotational angle accumulation value to the correction value lookup table and determines the correction values $K_{Aging}$. If there is no accumulated rotational angle value of the cam 220 in the input value list constituting the correction value lookup table, the controller 330 reads the correction values $K_{Aging}$ corresponding to the rotational angle cumulative value closest to the rotational angle cumulative value of the cam 220 from the correction value lookup table. Then, the controller 330 may obtain the correction value $K_{Aging}$ corresponding to the cumulative rotational angle value of the cam 220 through the interpolation between them. For example, if the accumulated rotational angle of the cam 220 is 1,500 degrees, the controller 330 calculates the correction value $K_{Aging}$ through interpolation between the accumulated rotational angle of 1000 degrees and 2000 degrees.

The controller 330 may obtain the target rotational angle of the cam 220 using the corrected target valve opening $\theta_T$ when the target valve opening degree of the valve 250 is corrected using Equation 2.

Table 2 below shows an example of the target rotational angles of the cam 220 according to the target valve opening degree $\theta_T$.

TABLE 2

Target rotational angle of the cam 220 according to the target valve opening degree $\theta_T$.

| | $\theta_T$ | | | | | | | | | | |
|---|---|---|---|---|---|---|---|---|---|---|---|
| | 0 | 10 | 20 | 30 | 40 | 50 | 60 | 70 | 80 | 90 | 100 |
| Target rotational angle [°] | 90 | 98 | 106 | 114 | 122 | 130 | 138 | 146 | 154 | 162 | 172 |

Referring to Table 2, the target rotational angle of the cam 220 may gradually increase as the target valve opening degree $\theta_T$ increases. The target rotational angles of the cam 220 in accordance with the target valve opening degree $\theta_T$ are the calibration values derived through testing in the production process of the coolant control valve unit. The target valve opening degree $\theta_T$ and the target rotational angle of the cam may be stored in the form of a mapped lookup table (Hereinafter referred as "cam rotational angle lookup table").

That is, when the target valve opening degree $\theta_T$ is obtained through Equation 2, the controller 330 can input the target valve opening degree $\theta_T$ as an input to the cam rotational angle lookup table to obtain the target rotational angle of the cam 220.

The total length of the valve 250 is reduced as the valve rod 252 of the valve 250 is worn out so that the movement distance of the valve 250 must be increased in order for the valve 250 to achieve a desired opening degree. Therefore, in the embodiment of the present disclosure, it is assumed that the degree of wear of the valve rod 252 is increased as the rotation of the cam 220 is accumulated as described above, and the target valve opening $\theta_T$ 220 may be increased.

The controller 330 compares the target rotational angle with the actual rotational angle of the cam 220 when the target rotational angle is obtained. The rotation of the motor 300 maybe controlled so that the cam 220 reaches the target rotational angle based on the difference between the two rotational angles.

The controller 330 may be implemented by one or more microprocessors operating according to a set program, and the set program may include a series of instructions for performing a method according to an embodiment of the present disclosure to be described later.

FIG. 5 is a flowchart showing a control method of a coolant control valve unit according to an exemplary embodiment of the present disclosure. The control method of FIG. 5 may be performed by the controller 330 of the control system shown in FIG. 2.

Referring to FIG. 5, the controller 330 receives the driving condition of the coolant control valve unit 125 including the output signals of the coolant temperature sensor 120, the vehicle speed sensor, the APS sensor, the ambient temperature sensor, and the RPM sensor and the like (S100). Then, the controller 330 obtains the target valve opening $\theta_T$ according to Equation 1 (S110).

The controller 330 corrects the target valve opening degree using the correction value $K_{Aging}$ (refer to '$K_{Aging}$' in Equation 2) according to the degree of wear of the valve 250 when the target valve opening degree is obtained according to the driving condition (S120). Then, the target rotational angle of the cam 220 is acquired in correspondence with the corrected target valve opening (refer to $\theta_T$ in Equation 2) (S130).

Then, the controller 330 obtains the actual rotational angle of the cam 220 (S140), and calculates the difference value between the target rotational angle and the actual rotational angle of the cam 220 (S150). Then, the rotational angle of the cam 220 is controlled by controlling the rotation of the motor 300 based on the difference between the two rotational angles (S160).

Thereafter, the controller 330 continuously performs steps S140 through S150 until the difference between the target rotational angle and the actual rotational angle of the cam 220 becomes equal to or less than the threshold value (S170). That is, the rotational angle of the cam 220 may be controlled until the actual rotational angle of the cam 220 approaches the target rotational angle calculated through the step S130.

According to the above-described embodiment, the coolant control valve unit 125 increases the target rotational angle of the cam 220 at the same operating condition as the wear of the valve 250 progresses. As the rotational angle of the cam 220 increases, the moving distance of the valve 250 in the downward direction increases, thereby also increasing the opening of the valve 250. Therefore, in the embodiment of the present disclosure, the length of the valve 250 shortened due to the abrasion of the valve rod 252 and the deficient opening amount may be compensated by increasing the rotational angle of the cam 220.

Thus, by maintaining the same valve 250 opening under the same operating conditions regardless of the wear of the valve 250, the stability and precision of the coolant control may be increased.

Normally, when the temperature of the cylinder head 105 increases, the amount of NOx generated increases, and when the temperature of the cylinder block 100 decreases, the fuel efficiency of the engine deteriorates. Therefore, the control method of the coolant control valve unit according to the embodiment of the present disclosure may improve the fuel consumption of the engine and reduce the exhaust gas emission through stable control of the coolant temperature When the rotational angle of the cam 220 is controlled without considering the degree of abrasion of the valve 250 in a state where the wear of the valve 250 is considerably advanced, the opening error of the valve 250 due to the wear of the valve 250 may occur. The opening error of the valve 250 makes it difficult to control the coolant temperature, and the wear of the valve 250 may be accelerated by increasing the number of opening and closing of the valve 250. Therefore, the control method of the coolant control valve unit according to the embodiment of the present disclosure minimizes the movement of the valve 250 in the process of following the target temperature of the coolant by correcting the opening error caused by the wear of the valve 250, and thus, the life time of the valve 250 may be improved.

Further, the opening error due to the wear of the valve 250 increases the difference between the target temperature and the current temperature of the coolant. As a result, in the course of adjusting the temperature of the coolant to the target temperature, high temperature coolant heated by the engine may be supplied to the radiator 130 in a large amount. When a large amount of high temperature coolant is frequently supplied to the radiator 130, thermal fatigue of the radiator 130 due to shrinkage/expansion is accumulated, thereby decreasing the durability of the radiator 130. Therefore, the control method of the coolant control valve unit according to the embodiment of the present disclosure may reduce the thermal fatigue of the radiator 130 in the process of following the target temperature of the coolant by correcting the opening error caused by the wear of the valve 250. So that, the durability of the radiator 130 may be improved.

The set program may be stored in a computer-readable recording medium, and the computer-readable recording medium may include any type of recording medium storing data that can be read by the computer system. Examples of the computer-readable recording device include ROM, RAM, CD-ROM, DVD_ROM, DVD_RAM, magnetic tape, floppy disk, hard disk, optical data storage, and the like. In addition, the computer-readable recording medium may be distributed to network-connected computer devices so that computer-readable codes may be stored and executed in a distributed manner.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A control system for a coolant control valve unit, which includes a cam and a valve that opens and closes a coolant passage in conjunction with rotation of the cam, the control system comprises:
    a motor controlling the rotation of the cam; and
    a controller configured to:
    correct a target valve opening degree of the valve using a correction value;
    determine a target rotational angle of the cam using the target valve opening degree corrected by the correction value; and
    control an operation of the motor according to the target rotational angle of the cam,
    wherein the controller accumulates a rotational angle of the cam to obtain a rotational angle cumulative value and determines the correction value according to the rotational angle cumulative value.

2. The control system of claim 1, wherein the correction value increases as the cumulative rotational angle value increases.

3. The control system of claim 1, further comprises a cam position detecting sensor detecting the rotational angle of the cam.

4. The control system of claim 1, wherein the controller controls the operation of the motor based on a difference between an actual rotational angle of the cam and the target rotational angle.

5. The control system of claim 1, wherein the controller calculates the target valve opening degree based on a driving condition of the coolant control valve unit and a difference between a target coolant temperature and current coolant temperature.

6. A control method for a coolant control valve unit, which includes a cam driven by a motor and a valve that opens and closes a coolant passage in conjunction with rotation of the cam, the control method comprises steps of:
    calculating, by a controller, a target valve opening degree of the valve;
    correcting, by the controller, the target valve opening degree of the valve using a correction value;
    determining, by the controller, a target rotational angle of the cam using the target valve opening degree corrected by the correction value;
    controlling, by the controller, an operation of the motor according to the target rotational angle of the cam;
    accumulating, by the controller, a rotational angle of the cam to obtain a rotational angle cumulative value; and
    determining, by the controller, the correction value according to the rotational angle cumulative value.

7. The control method of claim 6, wherein the correction value increases as the cumulative rotational angle value increases.

8. The control method of claim 6, further comprising a step of obtaining, by the controller, an actual rotational angle of the cam, and
    wherein the controller controls the operation of the motor based on a difference between the actual rotational angle of the cam and the target rotational angle.

9. The control method of claim 6, wherein the step of calculating the target valve opening degree of the valve comprises:
    obtaining a driving condition of the coolant control valve unit; and
    calculating the target valve opening degree based on the driving condition of the coolant control valve unit and a difference between a target coolant temperature and a current coolant temperature.

* * * * *